United States Patent

[11] 3,626,917

| [72] | Inventors | Richard H. Tromel<br>Canoga Park;<br>Paul C. Thys, Pacoima, both of Calif. |
|---|---|---|
| [21] | Appl. No. | 52,875 |
| [22] | Filed | July 7, 1970 |
| [45] | Patented | Dec. 14, 1971 |
| [73] | Assignee | North American Rockwell Corporation |

[54] DIESEL ENGINE STARTING AID
10 Claims, 7 Drawing Figs.

[52] U.S. Cl. .................................................. 123/142.5R,
123/179 H, 123/122 R
[51] Int. Cl. ........................................................ F02n 17/02,
F02m 31/02
[50] Field of Search............................................. 123/179 R,
179 H, 179 L, 142.5, 122 G

[56] References Cited
UNITED STATES PATENTS

| 1,387,848 | 8/1921 | Good.......................... | 123/179 H |
| 2,405,143 | 8/1946 | Holthouse..................... | 123/179 H X |
| 2,993,487 | 7/1961 | Konrad et al. ................ | 123/142.5 |
| 3,020,903 | 2/1962 | Kloss............................ | 123/142.5 |
| 3,024,777 | 3/1962 | Baker............................ | 123/122 G |
| 3,335,710 | 8/1967 | Reddy .......................... | 123/179 L X |
| 3,353,520 | 11/1967 | Haag............................ | 123/179 H X |
| 3,526,214 | 9/1970 | Kamo............................ | 123/142.5 X |

*Primary Examiner*—Al Lawrence Smith
*Attorneys*—L. Lee Humphries, Thomas S. MacDonald and D. Douglas Price

ABSTRACT: A self-contained air heating apparatus adapted to be mounted on an intake manifold of a diesel engine basically consists of a DC motor which performs the triple function of driving a liquid fuel pump, an air compressor, and the breaker points of an autotype of ignition distributor by a system of direct coupling and cam rings on a single shaft of the motor. A fuel atomizer cooperating with the components driven by the motor sprays a fine mist of liquid into at least one air induction manifold whereupon it is ignited by a sparkplug located adjacent the mist pattern.

INVENTORS
RICHARD H. TROMEL
PAUL C. THYS

BY Thomas S. MacDonald

ATTORNEY

INVENTORS.
RICHARD H. TROMEL
PAUL C. THYS
BY Thomas S. MacDonald
ATTORNEY 3,626,917

1

DIESEL ENGINE STARTING AID

BACKGROUND OF THE INVENTION

Starting diesel engines in trucks, tractor trailers, bulldozers, and other types of earth movers and machinery in cold weather has been a problem for years. The most common method to start a diesel is to inject ether into the intake manifold, whereupon the compression of the engine ignites the ether. Ether autoignites at a very low temperature however, it is relatively ineffective in temperatures much below 10° below zero.

There are many types of ether systems in the state of the art. One system utilizes a capsule adjacent the intake manifold of the engine. A gelatin capsule of ether is inserted in a container and sealed off. A pin forcibly punctures the capsule, thereby injecting the ether into the manifold; however, this is a one-shot attempt and if the engine does not catch, the procedure is repeated.

Another ether system, known as the "Turner Quick Start" basically consists of a cylinder of ether with conduits leading to spray nozzles in the intake manifold adjacent to each cylinder of the engine and, upon actuation, ether is injected into the manifold.

There are also aerosol cans of ether available to operators. When ether is poured into the air intake or sprayed into the air intake of the engine, there is a very real danger of damaging the engine if too large a charge of ether is injected into the engine. Too much ether will cause blown head gaskets or damage to the pistons, oftentimes necessitating rebuilding of the engine.

The mechanized ether injection systems heretofore described, namely, the gelatin capsule method and the "Turner Quick Start" method are relatively safe systems; however, they are ineffective in temperatures below −10°. In addition they require a separate fuel supply for the starting aid. The other systems described are dangerous in that there is an ever present possibility of an overcharge of ether which can severely damage the engine, causing costly repairs.

Therefore, it is an object of the present invention to provide an air heating system, utilizing the engine fuel, to heat up the intake manifolds for starting diesel engines in cold weather.

More specifically, it is an object of this invention to provide a self-contained air heating system designed to be attached to the intake manifolds of a diesel engine to provide a self-contained combustor, including an igniter and a fuel injection device, to, on command, provide a flame within the intake manifold, thereby heating up the air entering the manifold effectuating starting of the diesel engine during cranking in cold weather.

SUMMARY OF THE INVENTION

A self-contained air heating module is disclosed which includes a combustor and an auxiliary components module. The combustor utilizes a fuel atomizer capable of producing a fine mist of fuel at fuel flows as low as 0.1 gallon per hour. The auxiliary components module includes all subsystems necessary to operate the combustor.

The subsystems include a DC motor, operable by the usual 12-volt battery system within the vehicle, which drives a fuel pump off of one end of the motor drive shaft, thereby providing fuel flow to the atomizer. A pair of cams on the opposite end of the drive shaft of the motor are used to drive an atomizing air pump and an ignition breaker point system similar to that used in automobiles. Fuel level in the auxiliary components module is controlled by a liquid level sensing device which meters fuel from the primary vehicle fuel system to maintain fuel level within the module. A voltage regulator is utilized to maintain the voltage level to the DC motor within a specified range, preferably around 5 volts. When the diesel engine is being cranked during starting, the 12-volt system drops to approximately 5 volts and when the engine is running, the vehicle battery system can go as high as 15–16 volts. Therefore, the voltage regulator is desirable to provide a constant voltage to the module DC motor.

The fuel atomizer such as that shown in U.S. Pat. Nos. 3,421,692, 3,421,699, 3,425,059, and 3,425,058 may be employed. Basically, fuel is directed over the exterior of a spherical ball surface and pumped air from within the plenum inside of the spherical ball is directed through a slot in the ball, thereby breaking the surface tension of the film of liquid over the slot and atomizing the fuel. The device provides a very fine uniform mist of atomized fuel, thus effecting very efficient combustion when ignited. A sparkplug device ignites the spray of atomized fuel within the intake manifold of the diesel and the resultant flame heats the incoming air, thus effecting starting of the diesel engine during cranking speeds.

An advantage over prior methods, namely, the ether systems, is the elimination of any danger of damaging the engine due to overdosages of ether. The starting aid of the present invention, since it utilizes diesel fuel burning within an induction system, virtually eliminates any danger of catastrophic failure.

Still another advantage over the ether systems is the repeatability of the system, for example, if the engine does not catch on the first attempt at cranking, then the operator can repeat the procedure over again until the engine catches. There is no need to step out of the cab of the tractor and reinject another charge of ether into the engine. The module supplies fuel and ignition to the intake manifold as often as needed.

DESCRIPTION OF THE DRAWINGS

The above-noted objects and further advantages of the present invention will be more fully understood upon study of the following detailed description in conjunction with the detailed drawings, in which:

Referring now to FIG. 1, the auxiliary components module, generally designated as 10, directs liquid fuel, compressed air, and a source of ignition to at least one combustor zone 12, which is connected to, partially extended into or integral with an air induction manifold 14 which itself normally is an integral part of a diesel engine 16.

With reference to FIG. 2, the auxiliary components module 10 is attached to the diesel engine fuel pump 20 by conduit 22. Conduit 22 feeds into a solenoid valve 24. Electrical power is supplied to the module 10 by a battery system 26 (usually a 12-volt system). A switch 28 is located, for example, on the dashboard of a vehicle and manually controlled by the operator. The foregoing components, i.e., the diesel engine fuel pump 20, solenoid valve 24, battery 26 and switch 28, are all outside the auxiliary components module 10. Contained within the module 10 is a DC motor 30. The motor is powered by the battery system 26 and the voltage from the battery is fed into a voltage regulator 32, thereby regulating the voltage to the motor. Shaft 34 contains at one end 36 a liquid centrifugal pump 38 and at its other end 40, a pair of cams 42 and 44. The first cam 42 drives an air compressor generally designated as 50. The air compressor contains a pair of oppositely facing valves which, in the downward stroke of the compressor piston 52, draw in air through valve 54 and on the upward stroke of the piston, valve 54 closes, opening valve 56, which passes the compressed air out conduit 58 leading to the air atomizer generally designated as 60. The outermost cam 44 actuates an ignition breaker point mechanism generally designated as 70. Cam follower 72 rides on the surface of cam 44, thus actuating the breaker point system 70. The ignition system supplies a spark source to sparkplug 80 which is positioned adjacent to the fuel atomizer 60. The fuel atomizer and sparkplug 80 are mounted in juxtaposed position to and preferably extending into an opening in manifold 14 of diesel engine 16. Air flow enters the manifold 14 at end 15 and exits towards the cylinders of the diesel engine at 17.

Figure 2:
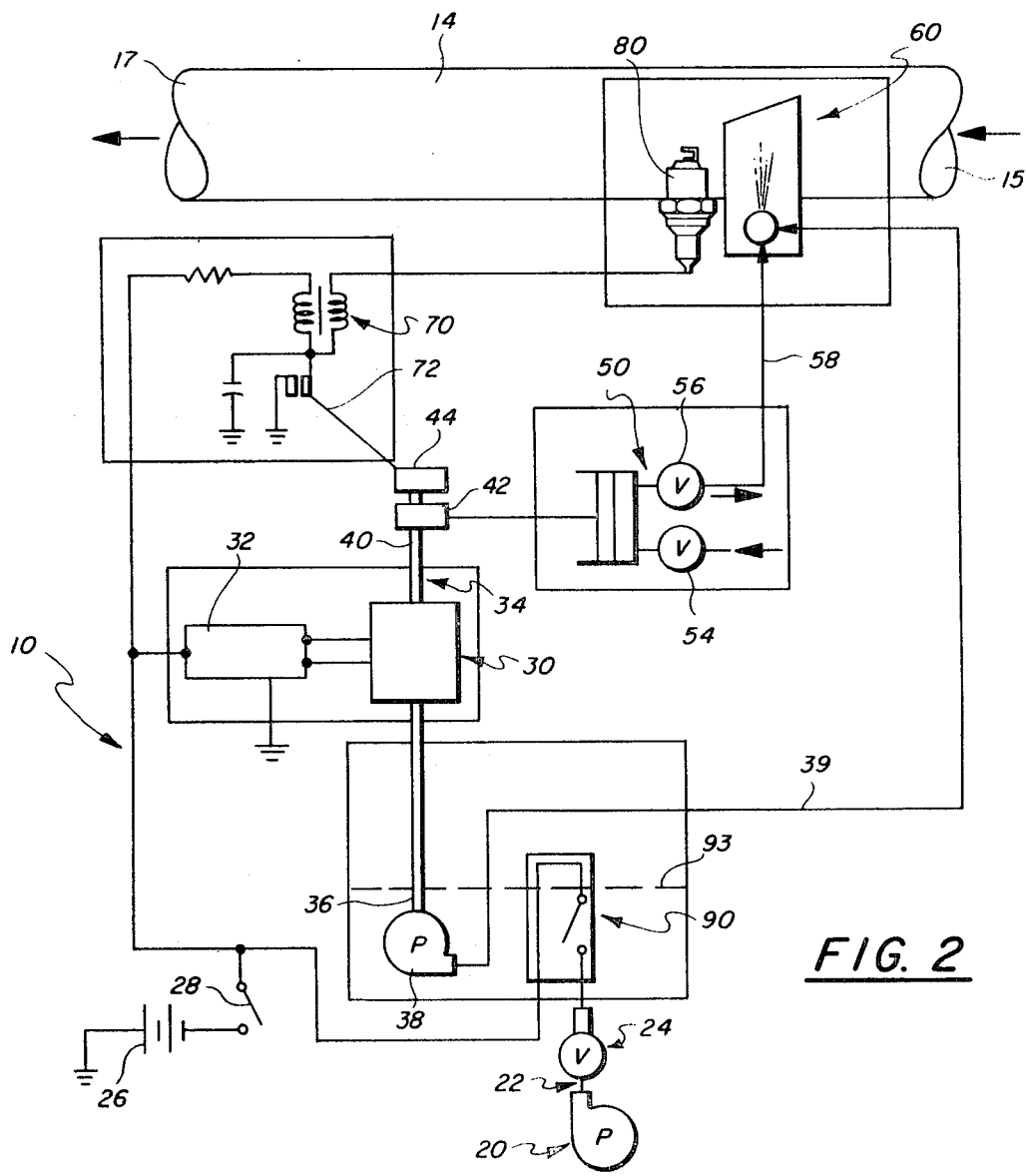
FIG. 2 is a schematic view of the various components involved in the diesel starting aid.
Figure 1:
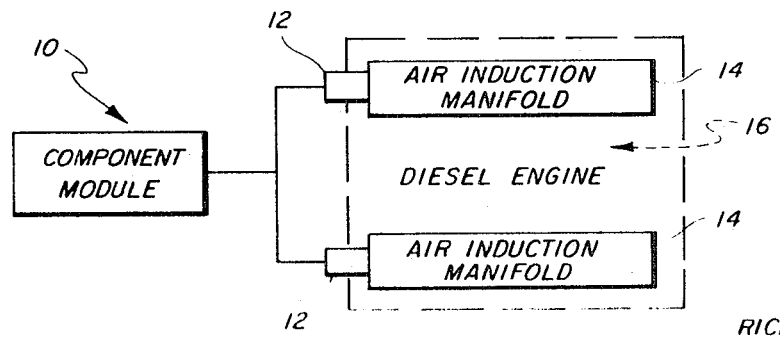
FIG. 1 is a schematic of the overall system indicating the engine starting air module, the combustors, and the intake manifolds of the diesel engine.

In operation, the auxiliary components module 10 is actuated by the operator by throwing switch 28 which initiates the following sequence of events. The switch supplies voltage to the voltage regulator 32 which supplies between 5 and 10 volts to the DC motor 30, depending upon where the regulator is set. For example, when the diesel engine is cranked over, the voltage often drops to around 5 volts from battery source 26. Consequently, the voltage regulator is set to regulate voltage at the 5-volt level so that when the diesel engine is idling and the battery system 26 jumps to approximately 12 volts, the voltage regulator maintains the voltage at the 5-volt level to assure uniform motor speeds, thereby providing uniform flow from the liquid pump powered by the motor 30. The motor drives pump 38 which directs liquid through conduit 39 towards the fuel atomizer unit 60. At the same time, the motor driven cams 42 and 44 start the air compressor 50, which supplies air under a pressure greater than ambient towards the interior of the fuel atomizer 60. The cam 44 actuates the breaker point system which supplies a spark to sparkplug 80. These simultaneous events cause the fuel to be atomized by atomizer 60 and sparkplug 80 to generate a spark which instantly initiates a flame through the combustor into air induction manifold 14, which immediately directs heat towards the cylinders of the diesel engine 16. At the same time the operator initiates switch 28, he also hits the starter button of the diesel engine and in very short order the engine comes to life. The starting aid has been successfully used in temperatures below −25° F.

Figure 3:
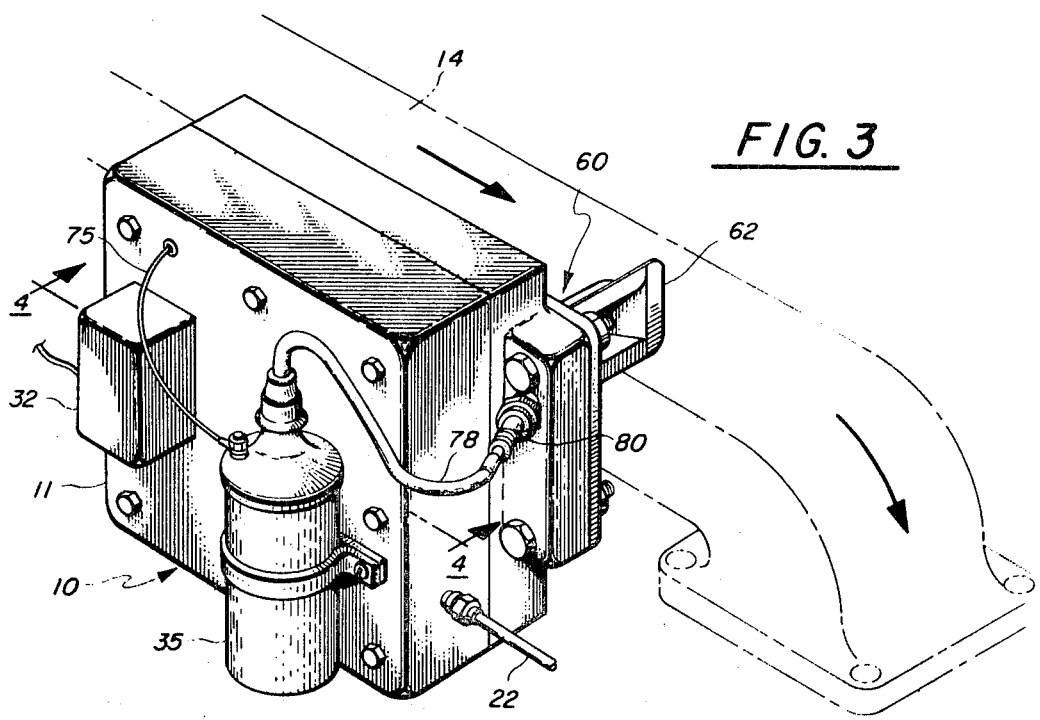
FIG. 3 is a perspective view of the auxiliary components module attached to the intake manifold of a diesel engine.

Referring to FIG. 3, the auxiliary components module 10 is shown in perspective connected to the air induction manifold indicated in phantom lines. The voltage regulator 32 and coil 35 are shown connected to the outside of housing 11. The sparkplug 80 is mounted on the outside of the module 10 primarily for ease of maintenance so that the plug can be removed and replaced when necessary. Part of the fuel atomizer assembly 60, namely, the combustor 62, is seen protruding into the manifold 14. The combustor 62 assures that the atomized fuel from the fuel atomizer 60 is directed towards the inlet end of the diesel engine. It can be seen that the sparkplug 80 is downstream of the fuel atomizer 60 to facilitate ignition of the atomized fuel. The direction of air flow is indicated by arrows within induction manifold 14. The fuel supply line 22 leading to the diesel fuel pump can be seen protruding from the side of the module case 11.

Figure 4:
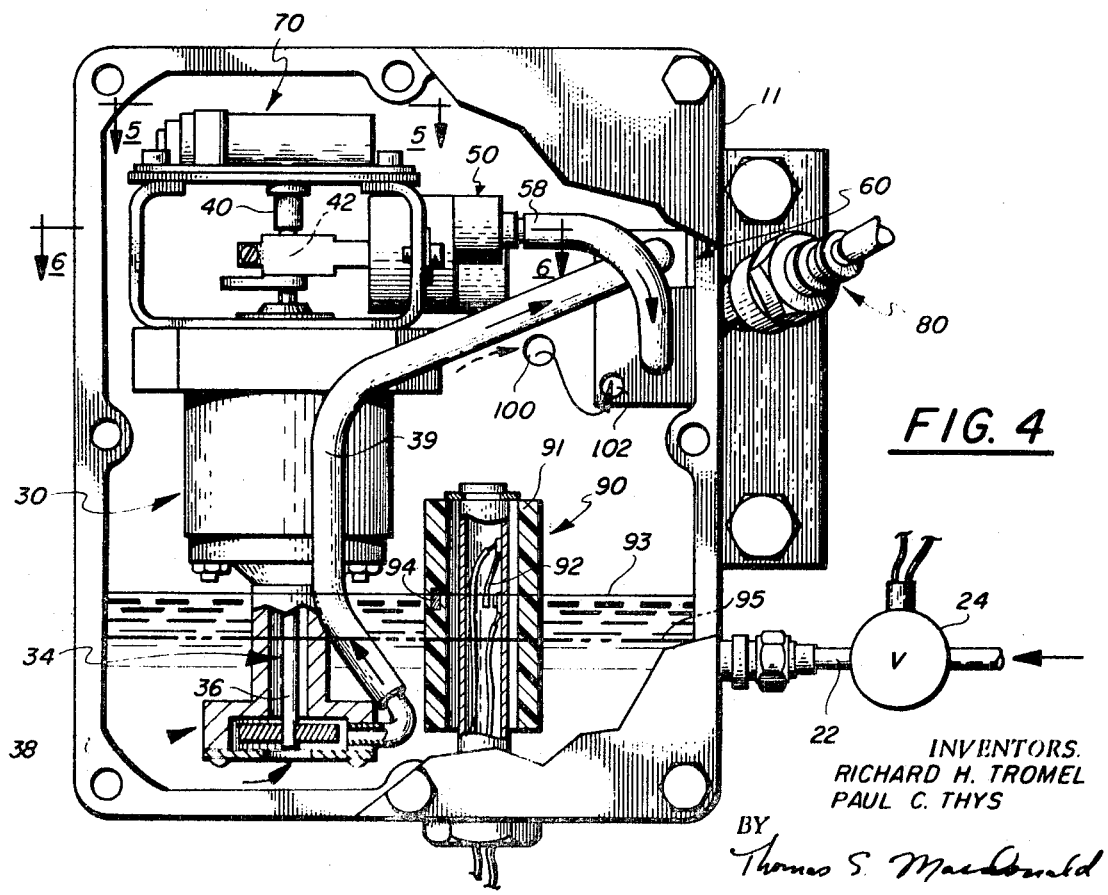
FIG. 4 is a view taken along lines 4—4 of FIG. 3, showing a cutaway side elevational view of the auxiliary components module indicating various components contained therein.

Turning now to FIG. 4, the housing 11, containing the various components of the module, comprises a DC motor 30 which, as stated before, has a liquid pump 38 which supplies liquid through conduit 39 to the fuel atomizer unit 60. At the opposite end of shaft 34 is a cam 42 which drives the air compressor unit 50, thus supplying air under pressure to the fuel atomizer 60. The ignition system 70 is driven by an uppermost cam 44 (not shown) which actuates the breaker points for providing a spark to the sparkplug.

A liquid level is maintained within housing 11 within a specified range by a known magnetic float assembly 90. Briefly described, the magnetic switch 92 is biased-closed and is forced open when magnet 94 is adjacent an arm of the switch 92, thereby forcing the contacts of the switch open, breaking the circuit. When the float body 91 drops below the liquid level designated as 93 to the reference line level 95, the magnet 94 drops below the switch 92, thereby allowing the switch to close, which actuates solenoid valve 24. Diesel fuel from fuel pump 20 (not shown) is then admitted through conduit 22 into the interior of housing 11. When the liquid again approaches the level indicated as 93, the permanent magnet in the float again breaks the circuit, thereby shutting off valve 24 and stopping the flow of liquid from the engine fuel pump.

A purge orifice 100 communicates with the interior of the air induction manifold 14 upstream of the combustor 62, as seen in FIG. 3. As air passes by the combustor there is a slight pressure drop from the backside of the combustor to the front or open side of the combustor. When an orifice is exposed to the backside of the shield 100, the slightly higher pressure in this vicinity directs air into the interior of housing 11 and out through orifice 102, which communicates between the interior of housing 11 and the interior of combustor 62 so that there is a flow of air from the air induction manifold 14 through orifice 102, past the fuel atomization unit, thereby assuring that there can be no flashback of flame past the fuel atomizer to the interior of the housing 11. The air flow path eliminates any danger of fire in the module unit itself.

Figure 5:
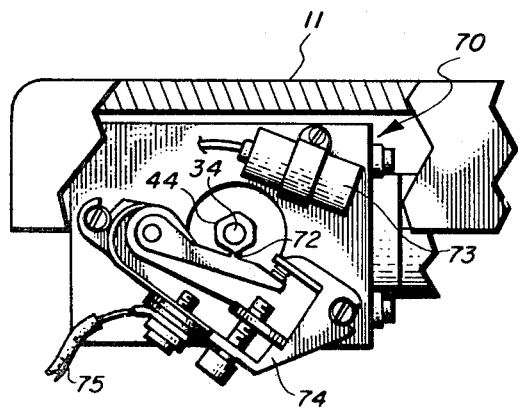
FIG. 5 is a view taken along 5—5 of FIG. 4, showing the ignition breaker points, condenser, etc., mounted near the top of the module.

Referring to FIG. 5, the ignition system designated as 70 comprises a breaker point assembly 74. Cam follower 72, being an integral part of the breaker point assembly 74 rides on cam 44, attached to shaft 34. The breaker point assembly is essentially identical to an automobile type of ignition system which includes a condenser 73. Lead wire 75 leads from the points to the coil 35 and from there to coil wire 78, to the sparkplug 80, as seen in FIG. 3.

Figure 6:
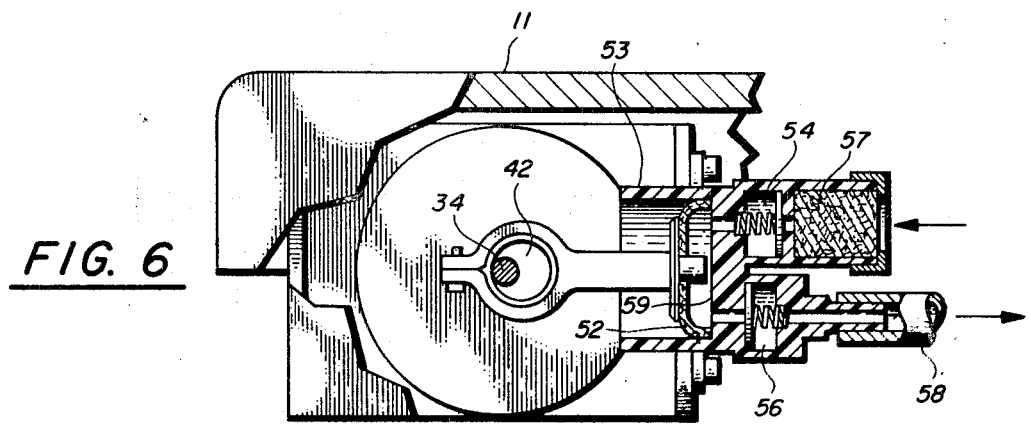
FIG. 6 is a view taken along lines 6—6 of FIG. 4, showing a partially cutaway view of the air compressor for the atomizer device.

FIG. 6 is a view taken through FIG. 4 of the air compressor or piston air pump assembly 50. Cam 42 drives rod 51 which extends from the cam bearing to the piston 52. A pair of oppositely facing one-way valves 54 and 56 coact in the following manner. As the piston travels down cylinder 53, valve 54 opens, admitting air into the chamber formed by the piston and the cylinder. An air filter 57 assures that noncontaminated air enters into the cylinder defined by the top of the piston and wall 59. As the cam rotates, the piston direction is reversed and as the piston 52 compresses the air in the chamber, valve 56 closes and valve 54 opens, directing compressed air into conduit 58 towards the fuel atomization unit generally designated as 60.

Figure 7:
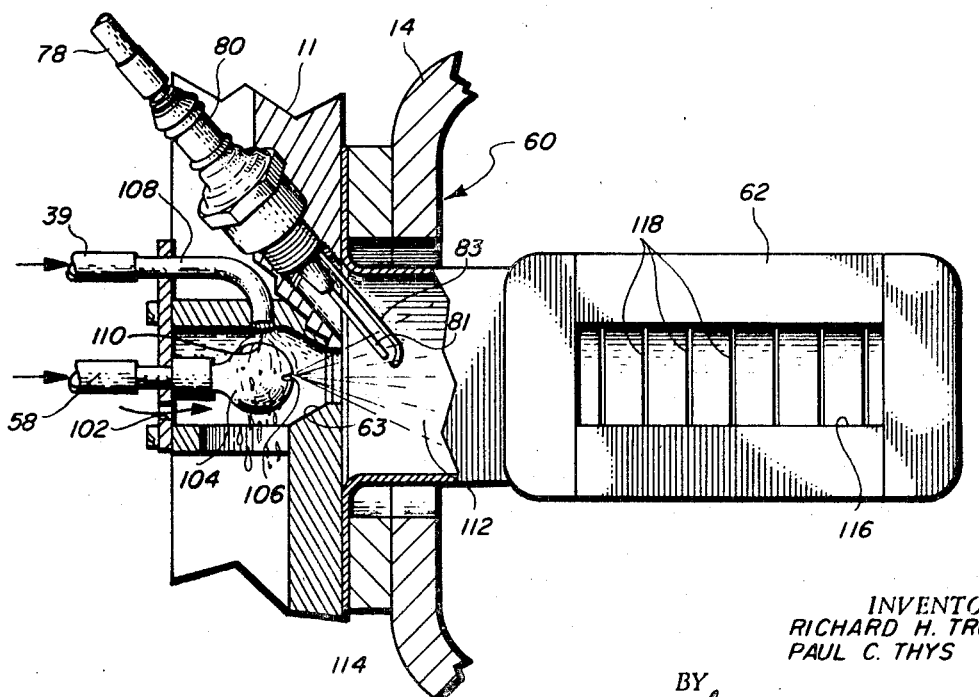
FIG. 7 is a view taken along lines 7—7 of FIG. 3, illustrating the atomizer device and sparkplug with a partially cutaway view of the combustor extending into the intake manifold of a diesel engine.

Fuel atomizer 60 is depicted in detail in FIG. 7 and it basically consists of a bulbous or spherical protrusion 104, generally fabricated from glass, with a narrow slot or aperture 106 near the outer end of the sphere. Fuel being pumped from the reservoir in housing 11 by pump 38 traverses conduit 39 into feed pipe 108, the liquid exits opening 110, striking the surface of the sphere 104. The spherical shape of the ball causes the liquid to spread itself in a thin film by surface tension over the ball. Compressed air from air compressor 50 traverses conduit 58 into the interior of the glass sphere 104 and out through slot 106, thereby breaking up the thin film of fuel over the surface of the sphere. A very fine mist of atomized fuel results which is blown into chamber 112, which is defined by combustor 62. The combustor is connected between housing 11 and auxiliary module mount block 114 and the whole module, for example, is bolted to air induction manifold 14. Sparkplug 80 is directed towards the vicinity of the mist pattern of the atomized fuel. The electrode 81 and ground rod 83, being elongated, extend into the middle of the atomized fuel and when the sparkplug fires, the resultant flame is directed through chamber 112 and out nozzle 116 into the interior of air induction manifold 14, thereby heating the incoming air to start the diesel engine. Baffles or louvres 118 within the nozzle throat 116 of combustor 62 tend to orientate the exiting flame pattern. The diffuser section 63 eliminates droplet collection at the edge of the atomizer aperture 106 since droplets on the outside edge of the spray accelerate smoothly into the combustion zone instead of being caught in the high turbulence at the aperture corner. The diffuser 63 aids in stabilizing the spray in the combustor and in thermally isolating the atomizer 60 from the combustion zone.

It should be noted that the sparkplug and the pneumatic fuel atomizer unit 60 can be mounted on an air induction manifold separate from the auxiliary components module 10. In addition, there can be several sparkplug fuel atomizer units mounted within both the air induction manifolds and there could be one of these units adjacent each cylinder of the diesel engine, all being fed by a single auxiliary components module.

Modulation of fuel flow over a range of 3 to 1 is accomplished by control of the fuel head within housing 11. This is accomplished by regulation of the DC voltage to the drive motor; also manual or automatic voltage control can be utilized with a temperature reference so that the system can be cut off automatically when the temperature rise triggers a thermostatic switch, thereby economizing the operation of the system. The starting aid previously described is relatively insensitive to fuel contamination as there are no easily clogged, superfine orifices that the fuel need traverse in the overall system.

The DC motor within the module 10 is normally designed to pump from 0.2 to 0.5 gallons per hour while the engine is cranking. The combustor 62 utilizes a swirl-stabilized system, i.e., louvres 118, which tends to isolate the heater from the relatively unpredictable flow patterns within the air induction intake manifold or manifolds 14. Swirl stabilization provides efficient combustion in small volumes and is widely used in combustion designs.

The air compressor unit 50 within housing 11 is subjected to the pressure within the interior of the housing 11 which gets its reference pressure from the pressures generated within manifold 14, hence the output pressure of the air compressor will always be above the manifold pressure, thereby assuring air pump performance regardless of the pressures within the manifold. The pump preferably is set to produce air at 8 p.s.i.g. while operating within the 0.2 to 0.5 gallons per minute fed to the atomizer 60. The fuel atomizer has been found to operate without any deterioration over the range of from 5 to 12 p.s.i.g. air pressure, so the pressure within the sphere 104 is noncritical to the operation of the diesel starting aid.

The diesel starting aid may obtain its source of ignition from either a sparkplug or a glow plug adjacent the fuel atomizer. However, glow plugs generally require large currents to maintain a temperature sufficient to ignite the atomized fuel. Large current drains imposed on the already burdened vehicle battery system during cranking would be detrimental to the starting capability of the overall system. Thus a sparkplug is preferred.

The vanes on louvres 118, heretofore described, being adapted to orient the transversely directed combustion products out of the combustor 62, with the direction of air flow through the air intake manifold 14, may be substituted with a plurality of slits or apertures located on the back or upstream side of combustor 62.

We claim:
1. A diesel engine starting aid comprising;
a housing,
means forming a fuel air mixture exit therefrom,
an electric motor, including a drive shaft, contained within said housing,
a fuel pump within said housing, connected to a source of fuel, and being driven by said shaft,
an air compressor within said housing and being driven by said shaft,
a fuel atomizer means in flow communication with said pump and said compressor, said atomizer being adapted to direct atomized fuel through said exit into at least one air intake manifold of a diesel engine when said liquid pump means supplies fuel to said atomizer and said compressor supplies compressed air to said atomizer, and
ignition means adjacent said atomizer means for igniting the atomized fuel within said manifold.

2. The invention as set forth in claim 1, in which said housing includes a combustor extending from said housing and adapted to fit within an engine air intake manifold,
said combustor being oriented to receive the atomized fuel from said atomizer means, and
said ignition means extending into said combustor.

3. The invention as set forth in claim 2 in which said combustor is elongated and has a first open end adapted to abut said fuel-air mixture exit, means forming a nozzle in said combustor extending transversely thereof to direct combustion products in a direction generally parallel to flow of air down the engine air manifold to the engine.

4. The invention as set forth in claim 3 in which said combustor includes at least one flow orienting device in said nozzle to direct the combustion products in a direction generally parallel to flow of air down the engine air manifold to the engine.

5. The invention as set forth in claim 2 in which said atomizer means is within said housing and said extension is directly affixed to said housing.

6. The invention as set forth in claim 2 including means forming an aperture in the intake manifold,
means forming an aperture in said housing communicating with said manifold aperture to expose the interior of said housing to a source of air flow from said manifold,
means forming a flow passage from the interior of the housing around said fuel atomizing means back into said manifold to prevent oxidized fuel from flashing back into said interior of said housing.

7. The invention as set forth in claim 2 in which said fuel-air mixture exit includes a diffuser section to accelerate the atomized fuel into the air intake manifold of the diesel engine.

8. A diesel engine starting aid comprising;

a housing adapted to be mounted to an intake manifold of said engine,
an electric motor within said housing, said motor having a common shaft with a liquid pump means and a first and second cam means in driving attachment to said shaft,
an air compressor means within said housing driven by said first cam means,
an ignition system within said housing operable by said second cam means of said shaft,
a fuel atomizer means connected within said housing, said atomizer being adapted to direct atomized fuel into said manifold when said liquid pump means supplies fuel to said atomizer and said air compressor means directs air to said atomizer,
an igniter means operable by said ignition system extending into said manifold adjacent said atomizer means to ignite said fuel when said fuel is injected into said manifold.

9. The invention as set forth in claim 8 wherein said pneumatic pump is a piston air pump, said piston being caused to reciprocate by said first cam means.

10. The invention as set forth in claim 8 wherein said atomizer means includes a diffuser section downstream of said atomizer means between said atomizer means and the air intake manifold, said diffuser section being adapted to accelerate the atomized fuel into the air intake manifold of the diesel engine.

* * * * *